United States Patent Office 3,507,826
Patented Apr. 21, 1970

3,507,826
STABILIZATION OF POLY(VINYL ALKYL ETHER) VULCANIZATES WITH p.PHENYLENEDIAMINE MIXTURES
Joginder Lal, Akron, Ohio, and James E. McGrath, Somerville, N.J., assignors to The Goodyear Tire & Rubber Company, Akron, Ohio, a corporation of Ohio
No Drawing. Continuation-in-part of application Ser. No. 405,826, Oct. 22, 1964. This application Jan. 30, 1969, Ser. No. 795,350
Int. Cl. C08g 51/60
U.S. Cl. 260—45.9     9 Claims

ABSTRACT OF THE DISCLOSURE

Poly(vinyl alkyl ether) vulcanizates stabilized with certain amine stabilizer mixtures.

---

This application is a continuation-in-part of application Ser. No. 405,826, filed Oct. 22, 1964, now abandoned.

This invention relates to poly(vinyl alkyl ether) vulcanizates and in particular those of relatively high molecular weight. More particularly this invention relates to poly (vinyl alkyl ether) vulcanizates that are stabilized against deterioration resulting from exposure to oxygen, ozone and atmospheric sunlight.

The poly(vinyl alkyl ethers) that may be stabilized in accordance with this invention are any of the materials of this class that are readily vulcanized with peroxide curing agents or peroxide curing agents in combination with sulfur or sulfur-bearing compounds. Representative examples of such vinyl alkyl ethers are vinyl methyl ether, vinyl ethyl ether, vinyl isopropyl ether, vinyl n-butyl ether, vinyl isobutyl ether, vinyl-n-hexyl ether, vinyl 2-ethylhexyl ether, vinyl n-octyl ether, vinyl octadecyl ether, etc. Preferred species include vinyl ethyl ether, vinyl-n-butyl ether and vinyl n-hexyl ether. Accordingly, the term "vinyl alkyl ether" as used throughout the specification and in the accompanying claims is intended to embrace the homopolymers, mixtures thereof and copolymers thereof defined and illustrated above with the alkyl chain being normally less than 20 carbon atoms and preferably less than about ten carbon atoms. The poly(vinyl alkyl ethers) to which this invention is particularly directed are those materials that have an inherent viscosity between 0.2 to somewhat in excess of 10.0, with the preferred range being from two to six deciliters per gram. These inherent viscosity values are determined at 30° C. on a 0.05 to 0.2 percent by weight solution of said poly(vinyl alkyl ether) in benzene containing 0.1 percent phenyl β-naphthylamine. Inherent viscosity is defined as the natural logarithm of the relative viscosity divided by the polymer concentration in benzene solution and is expressed in units of deciliters per gram.

This invention is also applicable to the copolymers of vinyl alkyl ethers which are prepared by polymerizing vinyl alkyl ethers with a suitable comonomer which is readily copolymerizable with vinyl alkyl ethers. Examples of such comonomers are: diolefins and multiolefins, such as 1-methoxy-1,3-butadiene; 2-ethoxy-1,3-butadiene; piperylene; 2-methyl-1,3-pentadiene; myrcene and allocymene. Suitable comonomers also include the vinyl allyl ethers, such as vinyl allyl ether, 1-vinyloxy-2-allyloxyethane, propenyl allyl ether and 1-vinyloxy-4-methallyl-oxybutane. These copolymers can be vulcanized with a conventional sulfur plus accelerator system. In essence, this invention embraces any copolymer of a vinyl alkyl ether with a suitable comonomer, which has a reactive group that can, subsequent to copolymerization, be used to form a three-dimensional network by reaction with other suitable materials. Thus, copolymers of vinyl alkyl ethers with vinyl 2-chloroethyl ether or β-vinyloxyethyl methacrylate also come within the scope of the above description.

The deleterious effect of oxygen, ozone and atmospheric sunlight on many organic polymers is well known and in the past substantial effort has been devoted to develop new and better stabilizers for these polymers and in particular the well known rubbery polymers such as natural rubber, styrene-butadiene rubber (SBR), etc. The stabilization of poly(vinyl alkyl ether) vulcanizates presents a new and challenging problem in that the type of degradation which the poly(vinyl alkyl ether) vulcanizates undergo is chain scission during aging, in contrast, for example, to SBR rubber, which undergoes crosslinking. As a result of extensive study we have found that most of the conventional, previously known stabilizers for natural rubber and SBR are incapable of providing an adequate degree of protection to poly(vinyl alkyl ether) vulcanizates.

It is therefore the object of this invention to provide a poly(vinyl alkyl ether) vulcanizate that is highly stable against the degrading effects of oxygen, ozone and sunlight. A further object of this invention is to provide a process that is particularly effective in stabilizing poly (vinyl alkyl ether) vulcanizates.

This invention is concerned with protecting poly(vinyl alkyl ether) vulcanizates against deterioration by incorporating in the compounding recipe a stabilizing amount of N,N'-disubstituted-p-phenylenediamines, i.e., a mixture of p-phenylenediamines conforming to the following structural formula:

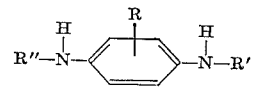

wherein R is selected from the group consisting of hydrogen, alkyl radicals having from 1 to 12 carbon atoms, cycloalkyl radicals having from 5 to 24 carbon atoms, and aryl radicals having from 6 to 24 carbon atoms, wherein R' is selected from the group consisting of alkyl radicals having from 1 to 12 carbon atoms, cycloalkyl radicals having from 5 to 24 carbon atoms, and aryl radicals having from 6 to 24 carbon atoms, and wherein R" is an aryl radical having from 6 to 24 carbon atoms.

Preferred compositions are those N,N'-disubstituted para-phenylenediamine (a) wherein both substituents attached to the nitrogens are lower alkyl substituted phenyl radicals, (b) wherein the substituent attached to one of the nitrogens is a phenyl radical and the substituent attached to the other nitrogen is a lower alkyl substituted phenyl radical and (c) wherein the substituent attached to one nitrogen is a lower alkyl substituted phenyl radical and the substituent attached to the other nitrogen is a secondary or tertiary alkyl radical having from 1 to 12 carbon atoms. In the above description of preferred compositions the lower alkyl substituents that are attached to the phenyl radicals may contain from 1 to 4 carbon atoms.

The phenylenediamines of this invention are illustrated by the following compounds:

N,N'-diphenyl-p-phenylenediamine
N-2-tolyl-N'-(2,4-dimethylphenyl)-para-phenylenediamine
N,N'-di(β-naphthyl)-p-phenylenediamine
N,N'-di(α-naphthyl)-p-phenylenediamine
N-3-tolyl-N'-(2,4-dimethylphenyl)-para-phenylenediamine
N-4-tolyl-N'-(2,4-dimethylphenyl)-para-phenylenediamine
N,N'-di(2-ethylphenyl)-para-phenylenediamine
N,N'-di(2,6-diethylphenyl)-para-phenylenediamine N-4-tertiary-butylphenyl-N'-phenyl-para-phenylenediamine
N,N'-di(4-tertiary-butylphenyl)-para-phenylenediamine
N,N'-di(2,4-dimethylphenyl)-para-phenylenediamine
N-4-ethylphenyl-N'-(2,4-dimethylphenyl)-para-phenylenediamine
N-2-ethylphenyl-N'-(2,4-dimethylphenyl)-para-phenylenediamine
N-2,6-diethylphenyl-N'-(2,4-dimethylphenyl)-para-phenylenediamine
N-2-tolyl-N'-ethylphenyl-para-phenylenediamine
N-4-tolyl-N'-2-ethylphenyl-para-phenylenediamine
N-3-tolyl-N'-4-ethylphenyl-para-phenylenediamine
N-2-tolyl-N'-4-tertiary-butylphenyl-para-phenylenediamine
N-4-tolyl-N'-4-tertiary-butylphenyl-para-phenylenediamine
N-3-tolyl-N'-4-tertiary-butylphenyl-para-phenylenediamine
N-2-tolyl-N'-phenyl-para-phenylenediamine
N,N'-di-2-tolyl-para-phenylenediamine
N,N'-di-3-tolyl-para-phenylenediamine
N,N'-di-4-tolyl-para-phenylenediamine
N-4-tolyl-N'-phenyl-para-phenylenediamine
N-3-tolyl-N'-phenyl-para-phenylenediamine
N-2,4-dimethylphenyl-N'-phenyl-para-phenylenediamine The ring alkylated diphenyl phenylenediamines of this invention may be further illustrated by the following products obtained by reacting various aromatic amines or mixtures of aromatic amines with either hydroquinone, an alkyl, cycloalkyl or aryl substituted hydroquinone, or para-aminophenol. The following are illustrative of the aromatic amines.

2,4-dimethylaniline
Mixed xylidines
Mixed toluidines and mixed xylidines
A mixture of C₅ anilines
A mixture of C₁₂ anilines
A mixture of C₅ anilines and o-toluidine
A mixture of C₅ anilines and mixed xylidines
A mixture of C₅ anilines and aniline
2-ethylaniline
2,6-diethylaniline
Mixed toluidines and 2-ethylaniline
Mixed xylidines and 2-ethylaniline
2,6-diethylaniline and aniline
4-tertiary-butylaniline
4-tertiary-butylaniline and aniline
Meta-toluidine and 2,4-dimethylaniline
Para-toluidine and 2,4-dimethylaniline
Ortho-toluidine and mixed xylidines
Aniline and ortho-toluidine
Aniline and meta-toluidine
Aniline and para-toluidine
Mixed toluidines
Mixed toluidine and aniline
Mixed xylidines and aniline
2,4-dimethylaniline and aniline
Mixed anisidines
Mixed phenetidines
O-Anisidine and aniline
p-Anisidine and aniline
p-Anisidine and mixed toluidines
p-Anisidine and o-toluidine
p-Phenetidine and aniline
p-Phenetidine and p-toluidine Illustrative of the N-aryl-N'-alkyl compounds are the following:

N-phenyl-N'-methyl-para-phenylenediamine
N-phenyl-N'-ethyl-para-phenylenediamine
N-phenyl-N'-isopropyl-para-phenylenediamine
N-phenyl-N'-propyl-para-phenylenediamine
N-phenyl-N'-normal-butyl-para-phenylenediamine
N-phenyl-N'-isobutyl-para-phenylenediamine
N-phenyl-N'-secondary-butyl-para-phenylenediamine
N-phenyl-N'-tertiary-butyl-para-phenylenediamine
N-phenyl-N'-hexyl-paraphenylenediamine
N-phenyl-N'-octyl-para-phenylenediamine
N-phenyl-N'-secondary-undecyl-para-phenylenediamine
N-phenyl-N'-secondary-dodecyl-para-phenylenediamine
N-phenyl-N'-cyclohexyl-para-phenylenediamine
N-phenyl-N'-alpha-phenylethyl-para-phenylenediamine
N-phenyl-N'-benzyl-para-phenylenediamine In place of the phenyl radical in the above listed N-aryl-N'-alkyl compounds the following radicals may be substituted:

Ortho-tolyl
Meta-tolyl
Para-tolyl
2-ethylphenyl
4-tertiary-butylphenyl
Octylphenyl
Dodecylphenyl
Octadecylphenyl
2,4-dimethylphenyl
3,5-dimethylphenyl
Trimethylphenyl Particularly useful stabilizers which may be effective in protecting poly(vinyl alkyl ether) vulcanizates in accordance with this invention are the reaction products prepared by reacting a hydroquinone with a compound selected from the group consisting of mixed xylidines, mixed toluidines and isopropyl anilines, said reaction being conducted in the presence of a condensation catalyst. This preferred class of stabilizers may also be prepared by reacting para-aminophenols with either aniline, toluidines, xylidines or isopropylanilines. In either of the above described preparations the amine compound is normally used in substantial molar excess, preferably in the ratio of two to two and one-half mols per mol of either hydroquinone or para-aminophenol. Examples of specific preferred stabilizing compounds are:

N-tertiary-butyl-N'-phenyl-para-phenylenediamine
N-isopropyl-N'-phenyl-para-phenylenediamine
N-(4-methylphenyl)-N'-phenyl-para-phenylenediamine
N,N'-di(methylphenyl)-para-phenylenediamine
N-(4-methyl-2-pentenyl)-N'-phenyl-para-phenylenediamine The poly(vinyl alkyl ether) vulcanizates to which this invention is directed are capable of being produced with improved physical properties and particularly improved tensile strength by incorporating in the polymer a reinforcing filler which is generally introduced at the time other additives are incorporated into the curing recipe. Normally about 10 to 80 parts of filler per 100 parts by weight of poly(vinyl alkyl ether) can be advantageously used with the preferred range being from 20 to 55 parts of filler per 100 parts by weight of poly(vinyl alkyl ether). Representative reinforcing fillers are the finely divided silica fillers such as CAB-O-SIL and the reinforcing carbon blacks such as HAF (high abrasion furnace black), ISAF (intermediate super abrasion furnace black), MPC (medium process channel black) and EPC (easy processing channel black).

The poly(vinyl alkyl ethers) may be vulcanized by incorporating a ditertiary aryl peroxide into the polymer and then heat treating this composition, preferably under pressure, at a temperature from about 250 to 350° F. for a sufficient time to develop the desired physical properties. Representative examples of suitable organic peroxide curing agents are:

Di(alpha, alpha-dioctylbenzyl) peroxide
Di(alpha, alpha-diethyl benzyl) peroxide Di(alpha, alpha-dimethyl benzyl) peroxide (commonly known as dicumyl peroxide)
Di(alpha, alpha-dimethyl-p-chlorobenzyl) peroxide etc.

The amount of ditertiary aryl peroxide to be employed in curing poly(vinyl alkyl ether) will vary with the particular polymer being treated as well as with the temperature of the heat treatment. Consequently, longer curing times will be required where low temperatures are employed than where high temperatures are employed. In general the addition of about 0.1 to about 15 parts by weight of the peroxide per 100 parts by weight of poly(vinyl alkyl ether) will be sucient to give a cure, but the preferred range is from about 0.5 to 10 parts by weight.

Improved poly(vinyl alkyl ether) vulcanizates are obtained if sulfur or a sulfur-bearing curing agent is employed in combination with the organic peroxide in curing the polymer. By the term "sulfur-bearing curing agent" as used throughout this specification and accompanying claims is meant a compound that is capable of releasing elemental sulfur under the curing conditions to which the polymer is subjected during curing. Preferred examples of the useful sulfur-bearing curing agents are the polysulfides such as:

Dioctyl tetrasulfide
Tetramethylthiuram disulfide
Tetraethylthiuram disulfide
Dipentamethylenethiuram tetrasulfide
4-morpholinyl 2-benzothiazyl disulfide When sulfur or a sulfur-bearing curing agent is used in combination with an organic peroxide the sulfur or sulfur compound will normally be employed in the range of from 0.5 to 10.0 parts per 100 parts by weight of polymer, although in some cases 30 or more parts of sulfur-bearing curing agents may be used.

The stabilizing agents that are to be used in order to stabilize the poly(vinyl alkyl ether) vulcanizates are incorporated in a conventional stabilizing amount which will normally vary from 0.1 to 5 parts by weight of the stabilizing agent based on 100 parts by weight of the poly(vinyl alkyl ether). It is generally desirable to add the stabilizer to the polymer in one of the polymerization finishing steps. However, in some cases it may be convenient to add the desired amount of stabilizer to the compounding recipe by mastication prior to vulcanization. In other instances the stabilizer may be advantageously incorporated by soaking the vulcanizate in a solution of the stabilizer and then subsequently drying the vulcanizate. In the following examples presented as illustrative of the invention, but not as limitations thereof, proportions are expressed as parts by weight per 100 parts by weight of polymer unless otherwise designated.

EXAMPLE 1

In order to evaluate the stabilizing ability of the N,N'-disubstituted para-phenylenediamines that are to be used as stabilizers in accordance with the present invention, one part by weight per 100 parts of polymer of a number of stabilizers was incorporated into different portions of a commercially obtainable sample of poly(vinyl ethyl ether), (EDBM), having an inherent viscosity of 4.0 when evaluated in benzene as described above. This commercially available raw polymer was mixed in a Banbury mixer with 40 parts of HAF carbon black at approximately 300° F. for 10 minutes. The black stock was then milled with 10 parts of Di-Cup 40C, (available from Hercules Powder Company, 40 percent dicumyl peroxide), 0.5 part of elemental sulfur and one part of one of the various antioxidants shown in the following table. The compounded polymer was then vulcanized for 30 minutes at 310° F. in a press. A control vulcanizate containing no added antioxidant was prepared similarly from the black stock. The physical properties of a SBR rubber sample are also shown in the table for comparative purposes. This SBR sample was prepared according to the following compounding formulation.

| | |
|---|---|
| Cold SBR | 100 |
| HAF carbon black | 50 |
| Stearic acid | 3 |
| Zinc oxide | 3 |
| Paraffin wax | 2 |
| Diphenylamino | 1 |
| Sulfur | 1.6 |
| Mercaptobenzothiazyl disulfide | 0.56 |
| Diphenylguanadine | 0.70 |

The reaction product used to stabilize stock A contains approximately 40 to 48 weight percent of N-phenyl-N'-ortho-tolyl-para-phenylenediamine, a maximum of 23 weight percent of N,N'-diortho-tolyl-para-phenylenediamine and a maximum of 24 weight percent of N,N'-diphenyl-para-phenylenediamine for a total content of at least 80 percent N,N'-diaryl-para-phenylenediamine.

TABLE I.—EFFECT OF AGING AT 250° F. ON THE PHYSICAL PROPERTIES OF POLY(VINYL ETHYL ETHER) VULCANIZATES: EFFECT OF THE PRESENCE OF ANTIOXIDANT (STABILIZERS) IN THE VULCANIZATE

| Stabilizer | Control | A | B | C | D | E | F | G | SBR |
|---|---|---|---|---|---|---|---|---|---|
| Tensile strength: | | | | | | | | | |
| (Unaged) | 2,020 | 1,750 | 2,250 | 2,090 | 2,090 | 2,250 | 1,810 | 2,190 | 3,640 |
| 36 hrs./250° F | 1,700 | 1,790 | 1,800 | 1,900 | 1,890 | 1,820 | 1,640 | 1,530 | 2,800 |
| 48 hrs./250° F | 1,330 | 1,650 | 1,410 | 1,640 | 1,150 | 1,740 | 1,610 | 630 | 2,520 |
| 60 hrs./250° F | 990 | 1,570 | 1,130 | 1,460 | 760 | 1,480 | 900 | 180 | 2,170 |
| Percent enlongation: | | | | | | | | | |
| (Unaged) | 400 | 420 | 580 | 450 | 420 | 510 | 400 | 550 | 440 |
| 36 hrs./250° F | 420 | 610 | 510 | 500 | 460 | 490 | 390 | 540 | 230 |
| 48 hrs./250° F | 450 | 570 | 550 | 480 | 450 | 530 | 450 | 530 | 200 |
| 60 hrs./250° F | 420 | 610 | 540 | 510 | 430 | 540 | 380 | 390 | 180 |
| Percent tensile retention: | | | | | | | | | |
| (Unaged) | 100 | 100 | 100 | 100 | 100 | 100 | 100 | 100 | 100 |
| 36 hrs./250° F | 84 | 102 | 80 | 91 | 90 | 81 | 91 | 70 | 77 |
| 48 hrs./250° F | 66 | 94 | 63 | 78 | 55 | 77 | 89 | 29 | 69 |
| 60 hrs./250° F | 49 | 90 | 50 | 70 | 36 | 66 | 50 | 8 | 60 |

A—Reaction product of hydroquinone, aniline and toluidine (1:1:1 molar ratio).
B—2,6-ditertiarybutyl-4-dimethylaminomethyl phenol.
C—4,4'-bis-2,6-ditertiarybutyl phenol.
D—Benzopyrene.
E—4,4'-thio-bis(3-methyl-6-tertiarybutyl phenol).
F—Dimethylol phenol.
G—Triphenyl phosphite.

After considering the data presented in the above table it will be apparent that the reaction product of hydroquinone with aniline and toluidine is surprisingly effective in preserving a high percentage of the original tensile strength of poly(vinyl ethyl ether) vulcanizate in comparison to the other stabilizers evaluated. This effectiveness is demonstrated by the tensile retention data in Table I. The tensile retention was calculated by dividing the tensile strength of the aged sample by the tensile strength of the unaged sample and multiplying the quotient by 100. It should be noted that while maintaining a very favorable percentage of the original tensile strength the sample protected with the reaction product of hydroquinone, aniline and toluidine also retained a high level of other desirable physical properties such as elongation.

EXAMPLE 2

A poly(vinyl ethyl ether) containing 50 parts of HAF carbon black per 100 parts by weight of polymer was compounded with 10 parts of Di-Cup 40C (a trademark of Hercules, Inc.—40% active material) and 0.37 part of sulfur. The stock was cured under pressure for 30 minutes at 310° F. The vulcanizate was cut into strips and extracted with acetone for 48 hours, the solvent being changed after 24 hours. The procedure was repeated using benzene. The vulcanizate swollen with benzene was allowed to dry in a hood, followed by drying for 48 hours under a high vacuum. A determination was made to discover how much benzene the samples could absorb. Antioxidants were then placed in benzene in concentrations sufficient, based on the amount of benzene that could be absorbed by the extracted samples, to incorporate predetermined levels of antioxidant into the extracted samples. The samples were allowed to swell and were then dried. In this manner samples were prepared with three different antioxidants so as to contain one and two parts of these antioxidants per 100 parts of rubber in the vulcanizate. These samples were then aged for 24 hours in an air oven at 300° F. A sample of the original vulcanizate, which had not been given any subsequent treatment was used as a control. Stress-strain and Shore A hardness measurements were made on the aged sample. Swelling ratio and percent solubility of the aged vulcanizates were determined in benzene according to the general procedure described in Rubber Chemistry and Technology, 36, p. 249 (1963).

As a poly(vinyl alkyl ether) vulcanizate degrades the tensile, percent elongation, 300 percent modulus and Shore A hardness tend to decrease and the swell volume and percent solubility tend to increase.

The following data were obtained, the values given being average values for duplicate samples.

containing the same antioxidant at two different levels. The aged vulcanizates containing mixtures of paraphenylenediamines (Samples Nos. 1 and 2) do not differ very much from each other. A similar situation exists between aged Samples Nos. 5 and 6 which contain 1 and 2 parts of nickel dibutyldithiocarbamate. However, aged Sample No. 4, which contained 2 parts of the Santowhite antioxidant, is apparently more degraded than the aged Sample No. 3 containing 1 part of the same antioxidant.

Swelling ratio of a vulcanizate, which is the ratio of the volume of a swollen vulcanizate to that of the dried vulcanizate, is another important characterizing parameter for a vulcanizate. The higher the swelling ratio the lower is the concentration of elastically effective crosslinks in the network. The data in Table II show that the para-phenylenediamine stabilizer was significantly more effective than either the thio-bisphenol or the dithiocarbamate stabilizer in resisting oxidative degradation reactions. The Shore A hardness values of the aged vulcanizates also attest to differences in the protection afforded these vulcanizates during aging.

EXAMPLE 3

A laboratory prepared poly(vinyl ethyl ether) with an inherent viscosity of 2.8 dl./g. was mixed with 50 parts of HAF carbon black in a Banbury for 10 minutes at 300° F. A compounded masterbatch was prepared as follows on a two-roll mill.

| | Parts by weight |
|---|---|
| Black stock | 150 |
| Di-Cup 40C [1] | 10 |
| Sulfur | 0.5 |
| Total | 160.5 |

[1] Hercules Inc., 40% active material.

One portion (L) of the masterbatch was compounded with 1.0 part per 160.5 parts of the masterbatch of a reaction product similar to that used to stabilize Stock A

TABLE II

| Stock—Antioxidant | Parts of antioxidant (100 parts of rubber in the vulcanizate) | Sample | Tensile strength (p.s.i.) | Percent elongation break | 300% modulus | Shore A hardness | Swelling ratio | Percent solubles |
|---|---|---|---|---|---|---|---|---|
| H...RP* of an approximately 1:1:1 molar ratio of hydroquinone, aniline and o-toluidine. | 1 | 1 | 737 | 600 | 346 | 64 | 8.7 | 10.4 |
| | 2 | 2 | 760 | 612 | 345 | 65 | 9.4 | 9.4 |
| I...4,4'-thio-bis (3-methyl-6-tertiary-butyl phenol) (Santowhite crystals). | 1 | 3 | 180 | 782 | 110 | 59 | 12.5 | 36.5 |
| | 2 | 4 | 87 | 815 | 82 | 58 | 12.8 | 53.3 |
| J...Nickel dibutyldithiocarbamate... | 1 | 5 | 370 | 645 | 184 | 57 | 10.8 | 20.7 |
| | 2 | 6 | 441 | 675 | 198 | 59 | 11.3 | 20.5 |
| K...Control | | 7 | 62 | 90 | | 53 | 14.3 | 54 |

*RP—Reaction Product.

In Table II the data reveal that both the phenol and carbamate stabilizers were greatly inferior to one of the para-phenylenediamine stabilizers of the present invention. The thio-bis phenol was particularly inferior to the paraphenylenediamine. The tensile of the vulcanizate stabilized with the latter was 4 to 8 or 9 times as great as the vulcanizate stabilized with the former. The 300 percent modulus was 4 times as great. As a poly(vinyl alkyl ether) vulcanizate degrades the network breaks down and some of the polymer actually becomes soluble in solvents such as benzene. As shown in Table II, the amount of soluble polymer in the degraded thio-bis phenol stabilized vulcanizate was 3 to 5 or 6 times as great as the soluble polymer in the para-phenylenediamine stabilized vulcanizate.

It is interesting to compare data on aged vulcanizates in Example 1. Another portion (M) of the masterbatch was compounded with 1.0 part per 160.5 parts of the masterbatch of a 50/25/25 mixture of N-phenyl-N'-ortho-tolyl-para-phenylenediamine, N,N' - diortho-tolyl-para-phenylenediamine and N,N'-diphenyl-para-phenylenediamine. The mixture was prepared by thoroughly mixing the three components in a ball mill. Therefore the latter mixture was essentially a purified form of the former mixture.

Tensile sheets were prepared from the masterbatch (Control) as well as the compounded stocks containing the antioxidants under study. Curing was done for 30 minutes at 310° F. Stress-strain properties were determined on unaged samples as well as samples which were aged in an air oven for 36, 48 and 60 hours at 250° F. Stress-strain properties on the oven-aged samples were determined according to the ASTM method. The results are listed in Table III.

TABLE III

| Stabilizer | Control | L | M |
|---|---|---|---|
| Tensile strength: | | | |
| (Unaged) | 1,950 | 1,985 | 2,058 |
| 36 hrs./250° F | 655 | 1,941 | 1,909 |
| 48 hrs./250° F | 323 | 1,860 | 1,858 |
| 60 hrs./250° F | 152 | 1,750 | 1,807 |
| Percent Elongation: | | | |
| (Unaged) | 312 | 440 | 482 |
| 36 hrs./250° F | 273 | 412 | 433 |
| 48 hrs./250° F | 253 | 405 | 423 |
| 60 hrs./250° F | 223 | 400 | 410 |
| Percent tensile retention: | | | |
| (Unaged) | 100 | 100 | 100 |
| 36 hrs./250° F | 33.6 | 97.8 | 92.8 |
| 48 hrs./250° F | 16.6 | 93.7 | 90.3 |
| 60 hrs./250° F | 7.8 | 88.2 | 87.8 |

As indicated by the above data, stocks L and M aged in essentially the same fashion.

Poly(vinyl alkyl ether) vulcanizates, depending upon the size of the alkyl group in the polymer, possess a wide range of low temperature properties which make them ideally suited for a number of practical applications. However, as has been previously explained, the poly (vinyl alkyl ether) vulcanizates are extremely susceptible to oxidation and in the past there has been no successfully stabilized polymers commercially available and, therefore, their extensive commercialization or even extensive development work leading to possible commercialization has not been undertaken.

While certain representative embodiments and details have been shown for the purpose of illustrating the invention it will be apparent to those skilled in this art that various changes and modifications may be made therein without departing from the spirit or scope of the invention.

What we claim is:

1. A poly(vinyl alkyl ether) vulcanizate having incorporated therein a stabilizing amount of a mixture of N,N′-disubstituted-para-phenylenediamines conforming to the following structural formula:

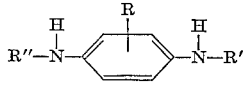

wherein R is selected from the group consisting of hydrogen, alkyl radicals having from 1 to 12 carbon atoms, cycloalkyl radicals having from 5 to 24 carbon atoms, and aryl radicals having from 6 to 24 carbon atoms, wherein R′ is selected from the group consisting of alkyl radicals having from 1 to 12 carbon atoms, cycloalkyl radicals having from 5 to 24 carbon atoms, and aryl radicals having from 6 to 24 carbon atoms, and wherein R″ is an aryl radical having from 6 to 24 carbon atoms.

2. A poly(vinyl alkyl ether) vulcanizate having incorporated therein a stabilizing amount of a mixture of N,N′-disubstituted phenylenediamines selected from the group consisting of (a) substituted phenylenediamines wherein both substituents attached to the nitrogens are lower alkyl substituted phenyl radicals, (b) substituted phenylenediamines wherein the substitutent attached to one nitrogen is a phenyl radical and the substituent attached to the other nitrogen is a lower alkyl substituted phenyl radical, and (c) substituted phenylenediamines wherein the substitutent attached to one nitrogen is a lower alkyl substituted phenyl radical and the substituent attached to the other nitrogen is a secondary or teriary alkyl radical having from 1 to 12 carbon atoms.

3. A poly(vinyl alkyl ether) vulcanizate having incorporated therein a stabilizing amount of a mixture of N,N′-disubstituted para-phenylenediamines selected from the group consisting of N,N′-di(methylphenyl)-para-phenylenediamine, and N-(4-methylphenyl)-N′-phenyl-para-phenylenediamine, N-tertiary-butyl-N′-phenyl-para-phenylenediamine, N-isopropyl-N′-phenyl-para-phenylenediamine, and N-(4-methyl-2-pentenyl)-N′-phenyl-para-phenylenediamine.

4. The poly(vinyl alkyl ether) vulcanizate of claim 1 prepared from a poly(vinyl alkyl ether) which is a copolymer of vinyl alkyl ether and a vinyl allyl ether selected from the group consisting of vinyl allyl ether and 1-vinyloxy-2-allyloxyethane.

5. The poly(vinyl alkyl ether) vulcanizate according to claim 1 prepared from a poly(vinyl alkyl ether) having an inherent viscosity between 0.2 and 10.0 deciliters per gram.

6. The poly(vinyl alkyl ether) vulcanizate according to claim 1 wherein the stabilizing amount of N,N′-disubstituted para-phenylenediamines is from 0.1 to 5.0 parts per 100 parts by weight of the poly(vinyl alkyl ether).

7. The poly(vinyl alkyl ether) vulcanizate according to claim 3 prepared from a poly(vinyl alkyl ether) having an inherent viscosity between 0.2 and 10.0 deciliters per gram, said poly(vinyl alkyl ether) being selected from the group consisting of poly(vinyl ethyl ether), poly(vinyl n-butyl ether) and poly(vinyl n-hexyl ether) and wherein the stabilizing amount of the N,N′-disubstituted para-phenylenediamines is from 0.1 to 5.0 parts per 100 parts by weight of the poly(vinyl alkyl ether) polymer.

8. The poly(vinyl alkyl ether) vulcanizate according to claim 7 wherein the vulcanizate is obtained using a curing system containing at least one peroxide selected from the group consisting of di($\alpha,\alpha$-dioctylbenzyl) peroxide; di($\alpha,\alpha$-diethylbenzyl) peroxide; di($\alpha,\alpha$-dimethylbenzyl) peroxide and di($\alpha,\alpha$-dimethyl-para-chlorobenzyl) peroxide.

9. The poly(vinyl alkyl ether) vulcanizate of claim 1 wherein the mixture is comprised of about 50 parts of N-phenyl-N′-ortho-tolyl-para-phenylenediamine, about 25 parts of N,N′-diortho-tolyl-para-phenylenediamine, and about 25 parts of N,N′-diphenyl-para-phenylenediamine.

References Cited

UNITED STATES PATENTS

| | | | |
|---|---|---|---|
| 2,087,199 | 7/1937 | Clifford | 260—45.9 |
| 2,825,719 | 3/1958 | Herrle et al. | 260—91.1 |
| 2,985,617 | 5/1961 | Salyer et al. | 260—45.9 |
| 3,216,959 | 11/1965 | Stahly | 260—45.9 |
| 3,260,698 | 7/1966 | Nakano et al. | 260—45.9 |
| 3,272,780 | 9/1966 | Wilson et al. | 260—45.9 |

HOSEA E. TAYLOR, JR., Primary Examiner

U.S. Cl. X.R.

252—401